United States Patent
Gregory, II (10) Patent No.: US 12,476,472 B1
(45) Date of Patent: Nov. 18, 2025

(54) SMART CONTROLLER FOR SEQUENCED POWER DELIVERY

(71) Applicant: Product Launch Advisors, LLC, Rock Hill, SC (US)

(72) Inventor: Richard O. Gregory, II, Rock Hill, SC (US)

(73) Assignee: Product Launch Advisors, LLC, Rock Hill, SC (US)

(*) Notice: Subject to any disclaimer, the term of this patent is extended or adjusted under 35 U.S.C. 154(b) by 327 days.

(21) Appl. No.: 17/826,591

(22) Filed: May 27, 2022

Related U.S. Application Data (60) Provisional application No. 63/194,718, filed on May 28, 2021.

(51) Int. Cl.
*H02J 3/46* (2006.01)
*G05B 15/02* (2006.01)
*H02J 3/14* (2006.01)
*H02J 7/00* (2006.01)

(52) U.S. Cl.
CPC .............. *H02J 3/472* (2020.01); *G05B 15/02* (2013.01); *H02J 3/14* (2013.01); *H02J 7/0013* (2013.01)

(58) Field of Classification Search
CPC . H02J 7/0013; H02J 3/14; H02J 3/472; G05B 15/02
See application file for complete search history.

(56) References Cited

U.S. PATENT DOCUMENTS

| | | | |
|---|---|---|---|
| 5,548,200 A | 8/1996 | Nor et al. | |
| 8,890,473 B2 | 11/2014 | Muller et al. | |
| 9,396,897 B1* | 7/2016 | Ademola | H01H 47/00 |
| 9,610,844 B2 | 4/2017 | Cho et al. | |
| 10,703,269 B2 | 7/2020 | Kusumi | |
| 10,723,239 B2 | 7/2020 | Jordan, III et al. | |
| 10,765,950 B1* | 9/2020 | Clementi | H01R 13/6658 |
| 2005/0280969 A1* | 12/2005 | Reynolds | G06F 1/305 |
| | | | 361/93.1 |

(Continued)

FOREIGN PATENT DOCUMENTS

| CN | 104505665 | 4/2015 |
|---|---|---|
| CN | 204732622 | 10/2015 |

(Continued)

OTHER PUBLICATIONS

ABB; Brochure for Optimax for Smart Charging, published Feb. 2020, 35 pgs.

(Continued)

*Primary Examiner* — Vincent H Tran
(74) *Attorney, Agent, or Firm* — Taylor Duma LLP (57) ABSTRACT

Apparatuses and methods for configurable sequencing of power across multiple outlets suitable for connecting to multiple device/equipment chargers. A smart controller device comprises a power input port, a plurality of power outlets, and a sequencer module. The sequencer module is configured to route power from the power input port to a first one or more of the plurality of power outlets until a sequencing condition is detected. Upon detecting the sequencing condition, the sequencer module discontinues routing of power to the first one or more of the plurality of power outlets, and routes power from the power input port to a second one or more of the plurality of power outlets based on the configured sequence.

18 Claims, 9 Drawing Sheets

(56) References Cited

U.S. PATENT DOCUMENTS

| | | | | |
|---|---|---|---|---|
| 2009/0268380 | A1* | 10/2009 | Brown | H02B 1/52 361/625 |
| 2010/0123997 | A1* | 5/2010 | Gerber | H02B 1/52 361/625 |
| 2011/0320834 | A1* | 12/2011 | Ingels | G06F 1/266 713/310 |
| 2013/0097070 | A1* | 4/2013 | Baker | G06Q 50/06 705/38 |
| 2013/0200584 | A1* | 8/2013 | Guasta | H02J 7/0013 280/79.2 |
| 2013/0200704 | A1* | 8/2013 | Pyle | H01R 25/003 307/31 |
| 2013/0338844 | A1* | 12/2013 | Chan | G05B 13/02 700/286 |
| 2014/0183977 | A1* | 7/2014 | Braunstein | H02G 3/00 307/147 |
| 2015/0045976 | A1* | 2/2015 | Li | H02J 13/00026 700/295 |
| 2015/0236453 | A1* | 8/2015 | Magee, Jr. | H01R 13/6691 307/40 |
| 2016/0041573 | A1* | 2/2016 | Chen | G05B 15/02 700/295 |
| 2016/0070324 | A1* | 3/2016 | Emby | G06F 13/4022 710/110 |
| 2016/0211676 | A1* | 7/2016 | Chiang | H02J 3/14 |
| 2017/0331321 | A1* | 11/2017 | Kan | H02J 13/00002 |
| 2017/0372288 | A1* | 12/2017 | Li | H01R 24/28 |
| 2018/0065496 | A1* | 3/2018 | Reynolds | H02J 3/14 |
| 2018/0107187 | A1* | 4/2018 | Singh | G05B 15/02 |
| 2018/0361870 | A1* | 12/2018 | Zhao | B60L 53/68 |
| 2020/0044479 | A1* | 2/2020 | Mohammad | H02J 7/0042 |
| 2020/0343734 | A1 | 10/2020 | Lin | |
| 2021/0184472 | A1* | 6/2021 | Sun | H01M 50/20 |
| 2021/0191443 | A1* | 6/2021 | Melcer | G06Q 20/145 |
| 2021/0354583 | A1* | 11/2021 | He | B60L 53/63 |
| 2022/0285892 | A1* | 9/2022 | Jack | H01R 25/003 |

FOREIGN PATENT DOCUMENTS

| | | |
|---|---|---|
| CN | 205141286 | 4/2016 |
| CN | 109130945 | 1/2019 |
| IN | 105958587 | 9/2016 |
| KR | 20180116031 | 10/2018 |
| WO | 2020173930 | 9/2020 |

OTHER PUBLICATIONS

Ferro, et al.; Article entitled: "Discrete event optimization of a vehicle charging station with multiple sockets", published Nov. 14, 2020, 31 pgs.

* cited by examiner

SMART CONTROLLER FOR SEQUENCED POWER DELIVERY

CROSS-REFERENCE TO RELATED APPLICATIONS

This application claims the benefit of U.S. Provisional Patent Application No. 63/194,718, filed May 28, 2021, and entitled "SMART CONTROLLER FOR SEQUENCED POWER DELIVERY," the entirety of which is hereby incorporated herein by this reference.

BACKGROUND

Co-located, battery-powered electrical equipment may compete for electrical infrastructure resources to stay fully charged. For example, a provider of rental equipment (e.g., scissor lifts) may have a difficult time keeping the equipment fully charged and ready for use/rental due to power availability and infrastructure limitations at the location. Requiring personnel to manually switch on and off various charging equipment on an arbitrary time schedule to stay within these power availability and infrastructure limits may create inefficiencies in charging as well as result in some equipment remaining uncharged and unavailable for use/deployment.

It is with respect to these considerations and others that the disclosure made herein is presented.

SUMMARY

The present disclosure relates to technologies for a smart controller device capable of configurable sequencing of power to multiple outlets suitable for connecting multiple device/equipment chargers. According to some aspects, a smart controller device includes a power input port, a sequencer module, and multiple power outlets. The sequencer module is configured to sequence power from the power input port to one or more of the power outlets in a sequence based on one or more sequencing conditions. The sequencing conditions may include a configured duration of time for the currently powered outlet(s) being on exceeded, a current draw at the powered outlet(s) dropping below a configurable current threshold value, or a combination of these and other conditions. When the sequencing condition occurs, the power sequencing circuit turns off the currently powered outlet(s) and turns on the next outlet(s) in the sequence. When the sequence is complete, the power sequencing circuit may repeat the sequence again.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for a smart controller device capable of configurable sequencing of power across multiple outlets suitable for connecting to multiple device/equipment chargers. According to embodiments described herein, a smart controller device may be provided for electrical equipment that helps rental equipment providers and other users who have facility power limitations. The smart controller device shares electric facilities power by sequencing power to a number of outlets one outlet after another. The device may work using a sequencer module comprising a programmable logic controller ("PLC") or other processing device that sequentially schedules the power allocated to each of a number of power outlets. The smart controller device may turn each outlet on for a specified period before sequencing to the next outlet. When the sequence is complete, the smart controller device can repeat the sequence again or turn itself off.

In further embodiments, the smart controller device may include a current sensor that senses a drop in current demand of the powered outlet(s), allowing the device to sequence to the next outlet, ensuring a connected device that doesn't need power/charging won't be allocated a full duration of time. Sequencing through the outlets in such a round-robin fashion, turning each outlet on one at a time based on time duration and/or amount of current draw, reduces the total power demand for the connected devices. According to some embodiments, one smart controller device may power up to 6 devices to keep them fully charged and ready for use while utilizing just 10A @ 125V~50-60 Hz. Because the smart controller device operates at the standard electrical outlet/supply level, the smart controller device can work for all sorts of standard 120V electrical devices like walkie-talkie charging stations, power tool battery chargers, and even devices such as electric floor cleaners and golf carts. Higher powered and/or multi-phase smart controller devices, potentially with more outlets, may also be implemented using the same operating principles and similar components and configurations for different use cases.

Figure 1:
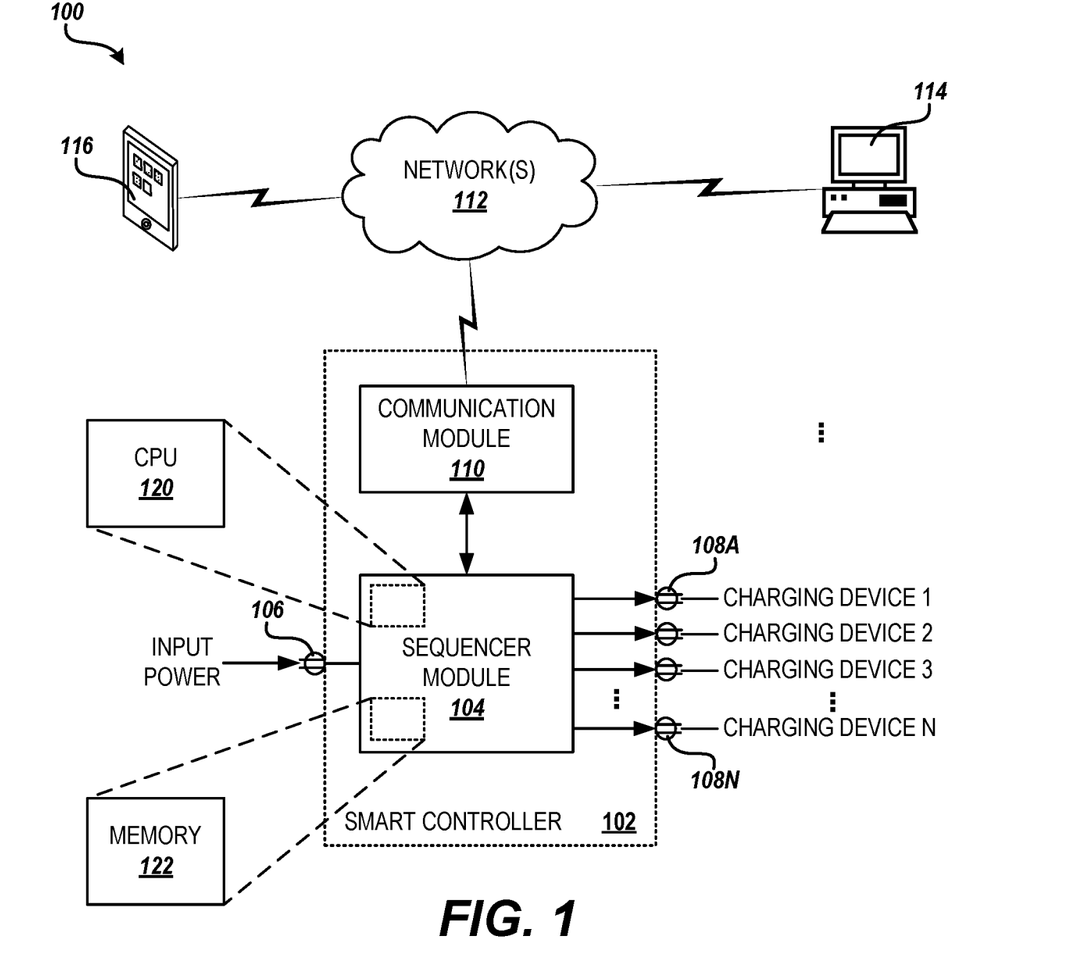
FIG. 1 is a system diagram showing an illustrative operational environment for implementing and operating a smart controller, according to embodiments presented herein.

FIG. 1 shows an exemplary operational environment 100 for the embodiments described herein. The environment includes the smart controller 102 device. The smart controller 102 includes a sequencer module 104 that sequences input power from a power input port 106 to a number of power outlets, such as power outlets 108A-108N (generally referred to as "power outlets 108"), in a sequential fashion. The power outlets 108 may be connected to a number of charging devices for various equipment, for example. According to embodiments, the sequencer module 104 includes a CPU 120 and a memory 122. The CPU may represent typical processor(s) or processing resources found in conventional PLCs and microcontrollers, for example. The memory 122 may include a random-access memory ("RAM") used to support operations of the sequencer module 104 as well as non-transitory computer-readable storage media, such as a read-only memory ("ROM") and/or non-volatile RAM ("NVRAM"), for storing a firmware, user programs, configuration data, and other routines and data necessary for the operation of the smart controller 102 in accordance with the embodiments described herein.

According to further embodiments, the smart controller 102 may include a communication module 110 that connects the sequencer module 104 to one or more external computing devices, such as a smartphone 116 or personal computing device 114, over one or more networks 112. The network(s) 112 may comprise one or more of a cellular data (e.g., LTE) network, a Wi-Fi network, a LAN, a WAN, the Internet, and/or any other networking topology known in the art that connects the smart controller 102 to the external computing devices 114, 116 or other, remote computers or computing systems. The network(s) 112 may further represent virtualized processing resources, storage resources, communication resources, and application resources from any number of server computing devices in a cloud-based computing system, including web services, application services, database services, and the like.

Figure 3:
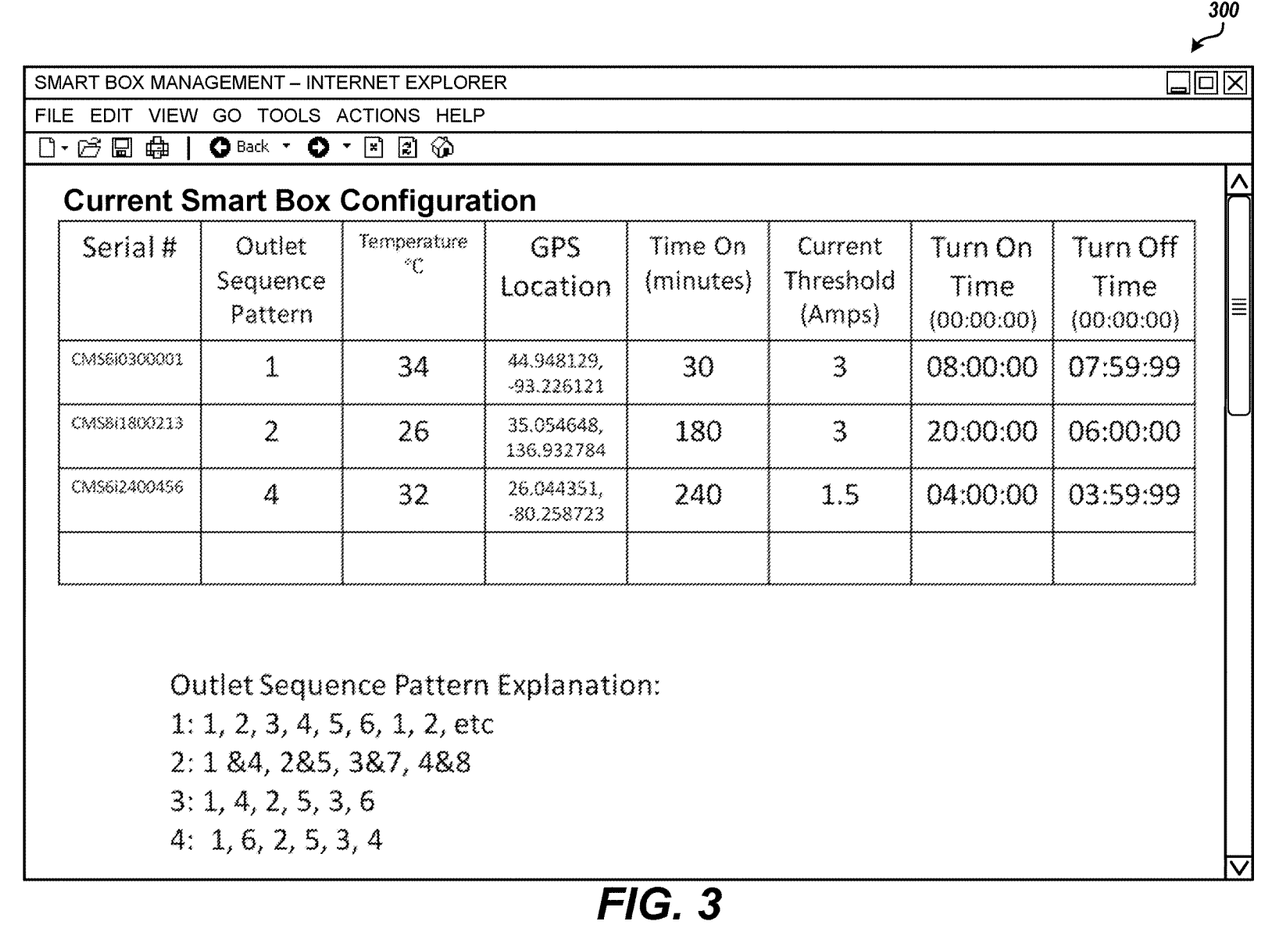
FIG. 3 is a GUI diagram showing an illustrative web interface on a computing device for management of the smart controller, according to embodiments presented herein.

According to some embodiments, the communication module 110 allows users of the external computing devices 114, 116 to remotely query status of the smart controller 102, operate the device, configure and program the device, disable the device, and the like. Utilizing these capabilities, a user may be able to remotely schedule operation of multiple smart controllers 102 in the field and change the sequencing of power outlets 108, the duration of "on time" allotted to each outlet, the current threshold for changing sequence, and other operational parameters and configurations within each device or across a number of devices. Cloud-based database resources in the network(s) 112 may be utilized to log operation of any number of smart controllers 102 belonging to a particular user or installation and track parameters such as serial number of each controller, the currently selected outlet sequence, the temperature of the device, a GPS location of the device, the currently configured on time for each power outlet 108 or grouping of outlets in the sequence (e.g., a first sequencing condition), a current threshold for progressing the sequence (e.g., a second sequencing condition), a scheduled time of operation of the device, and/or the like. For example, a user or administrator may be presented a web interface 300 from a web server containing some or all of the information from the database, as shown in FIG. 3. In a preferred embodiment, the communication module 110 may utilize cellular service for remote interrogation and control so that permission to use LAN or Wi-Fi does not have to be obtained from an owner of the premises where the smart controller 102 is installed. Where utility rates tend to be high, the smart controller 102 may use the remote scheduling feature to take advantage of lower electrical rates, e.g., charging downstream devices at night.

In further embodiments, the smart controller 102 may include a charging device (not shown) that drives multiple, specific charging ports for common devices, e.g., multiple charging cables for golf carts or forklifts, in lieu of standard electrical power outlets 108A-108N. One smart controller 102 could then sequence the charging of some number of golf carts, forklifts, or the like with a single charging device, saving the cost of additional charging units. In some embodiments, the charging device may be internal to an enclosure of the smart controller 102. In other embodiments, the charging device may simply provide appropriate power to the power input port 106, with the sequencer module 104 routing the power to each of the multiple charging ports in the appropriate sequence.

Figure 2:
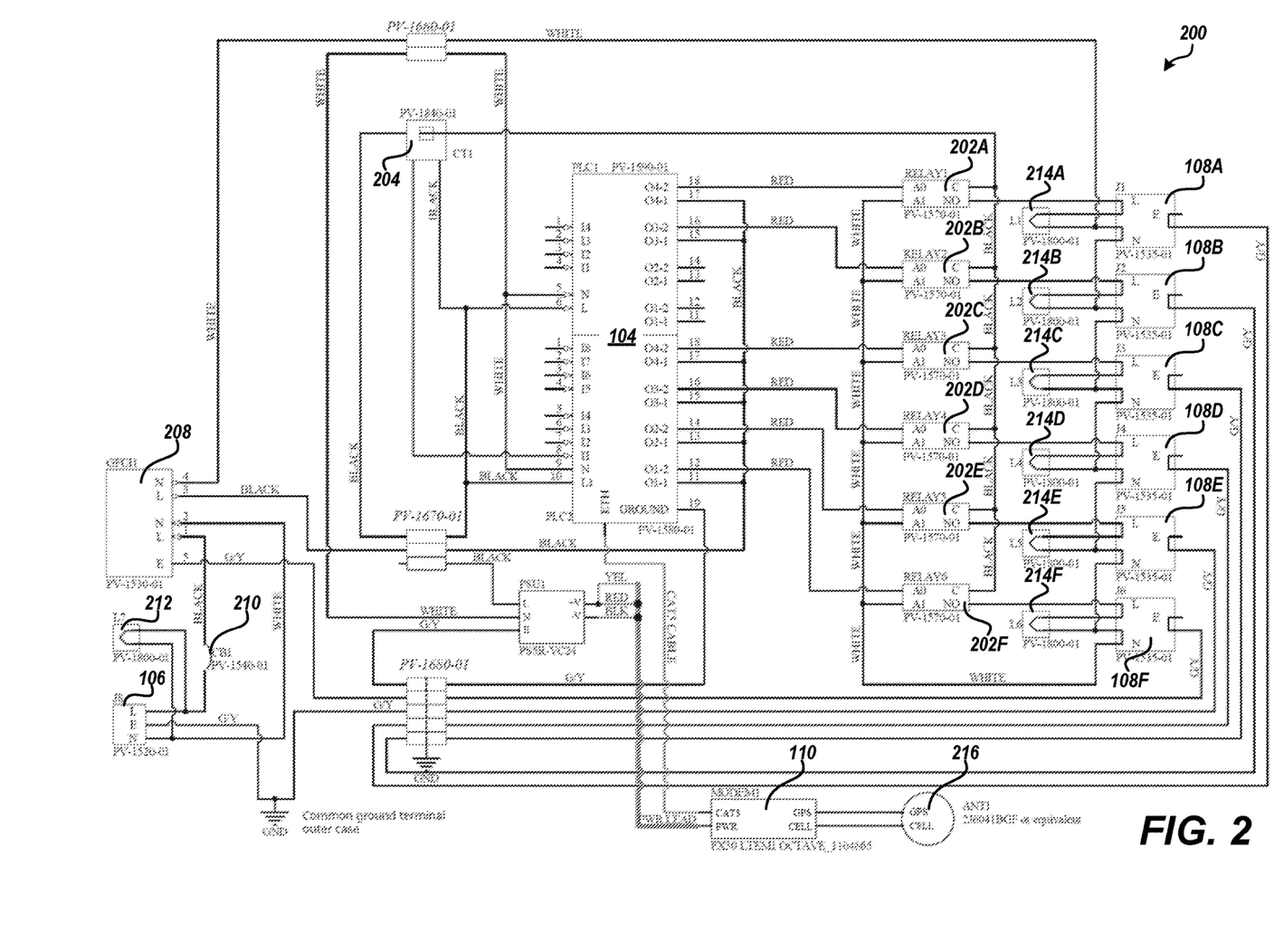
FIG. 2 is a circuit diagram showing one illustrative circuit for the smart controller, according to embodiments presented herein.

FIG. 2 shows a circuit diagram of an illustrative circuit 200 for implementing the smart controller 102 according to the embodiments described herein. The circuit 200 includes the sequencer module 104, the power input port 106, and six illustrative power outlets 108A-108F. As described above, the sequencer module 104 sequences input power from the power input port 106 to the power outlets 108 in a sequential fashion based on configuration data that defines a sequence order of the outlets, timing information for the sequence, sequencing conditions, and the like. According to some embodiments, the sequencer module 104 may comprise a PLC, such as the modular SmartRelay PLC from IDEC Corporation. The type and model of the SmartRelay utilized may depend on the voltages and/or AC frequencies to be handled by application and/or region as well as the number of power outlets 108 supported and the type of downstream devices, such as battery chargers, connected to the outlets. According to some embodiments, the sequencer module 104 may comprise an IDEC® FLIF-H12RCC SmartRelay CPU coupled with an IDEC® FLIF-M08C2R2 SmartRelay Expansion Module, as shown in the circuit diagram of FIG. 2, to support a 110-240V AC compatible smart controller 102 implementation with six or more power outlets 108.

The sequencing scheme for the power outlets 108 may be implemented in the sequencer module 104 as one or more sequence routines or programs along with associated parameter data (also referred to herein as "associated configuration data"). In further embodiments, the sequencer module 104 may contain a user interface, such as a screen and input keys allowing operation, configuration, and programming directly at the device, as well as an interface for connecting external computing devices to facilitate these functions, such as the RJ45 Ethernet port of the IDEC® SmartRelay CPU. The memory 122 of the sequencer module 104 may further comprise removable NVRAM, such as the microSD card slot of the IDEC® SmartRelay CPU, allowing further remote programming and configuration. Programming of the sequencer module 104 may be facilitated using conventional programming languages for PLCs, such as Ladder Logic or Functional Block Diagrams, and/or proprietary programming languages and methods, such as SmartRelay circuit programs of the IDEC® SmartRelay CPU.

In some embodiments, the sequencer module 104 may be connected to the power input port 106 through one or more of a ground-fault circuit interrupter (GFCI) 208 and a circuit breaker 210 to allow for protection of the internal components of the smart controller 102 as well as the downstream devices connected to the power outlets 108. The type and characteristics of the GFCI 208 and circuit breaker 210 components will depend on the specific requirements of the implementation, like input voltage, the number of power outlets 108 supported, the number and type of downstream devices, the maximum current draw of internal components and simultaneously powered downstream devices, and the like. In further embodiments, the sequencer module 104 routes the power from the power input port 106, through the GFCI 208 and/or circuit breaker 210 to one or more of the power outlets 108A-108F utilizing one or more switching devices 202A-202F, such as electrical relays, triacs, or the like, corresponding to each outlet. For simplicity of implementation, the switching devices 202A-202F may be selected to utilize the same voltage and current specifications as the other components of the smart controller 102 as well as the downstream devices connected to the power outlets 108.

In further embodiments, the circuit 200 may include a current sensor 204 that provides a measurement of the current draw of the downstream devices connected to the power outlets 108 to the sequencer module 104. The current draw may be utilized in evaluating sequencing conditions in the configuration/programming of the smart controller 102, as described in various embodiments herein. The circuit 200 may further include a number of lighted indicators, such as indicator lights 212 and 214A-214F, to indicate various operational status information to users of the smart controller 102. For example, the indicator light 212 may indicate that power is connected to the power input port 106, while the indicator lights 214A-214F may indicate that the sequencer module 104 has activated one or more of the switching devices 202A-202F to provide power to power outlets 108A-108F, respectively.

The circuit 200 may also include the communication module 110 that connects the sequencer module 104 to external computing devices 114, 116 over the network(s) 112. According to some embodiments, the communication module 110 may comprise a modem, such as a Sierra Wireless® FX30 LTE-M cellular gateway, that connects the sequencer module 104 to external computing devices over one or more of cellular data networks. The communication module 110 may connect to the sequencer module 104 by a data connection, such as an ethernet cable connecting the module to the ethernet port of the IDEC® SmartRelay CPU. In some embodiments, the communication module 110 may also require a dedicated power supply included in the circuit 200 (labeled "PSU1" in circuit 200 and Table 1). The communication module 110 may further be connected to an antenna 216 that is mounted externally to an enclosure of the smart controller 102.

According to some embodiments, the circuit 200 of FIG. 2 may be implemented with the types and models of components specified in Table 1 below in order to provide a smart controller 102 supporting 120V AC 50-60 Hz power input and six (6) power outlets 108 supporting common 120V downstream devices, as described herein.

TABLE 1

Exemplary Components for Circuit

| Label in Circuit | Description | Manufacturer | Part Number |
|---|---|---|---|
| PV-1520 (J8) | Power Input Port | LEVITON | LEV-5278-CWP |
| PV-1530 (GFC11) | GFCI Outlet | LEVITON | LEV-GFRBF-W |
| PV-1535 (J1-6) | Outlet | LEVITON | LEV-5821-W |
| PV-1560 (SKT1-6) | Relay Socket | IDEC | SJ1S-07LW |
| PV-1570 (RELAY1-6) | Relay | IDEC | RJ1S-CL-A120 |
| PV-1580 (PLC2) | PLC | IDEC | FL1F-H12RCC |
| PV-1590 (PLC1) | PLC Expander | IDEC | FL1F-M08C2R2 |
| PV-1660 | DIN Terminal Block | WIEDMULLER | 1SNK505010R0000 |
| PV-1670 | DIN Terminal Block | WIEDMULLER | 1SNK505066R0000 |
| PV-1680 | DIN Ground Terminal Block | WIEDMULLER | 1SNK505150R0000 |
| PV-1800 (L1-7) | Power Indicator Lamp | NSI Industries | NS179750LW |
| PV-1840 (CT1) | Current Sensor | Dwyer Instruments | CCS-121050 |
| PV-1900 (ANT1) | Antenna | Taoglas Limited | MA111.C.LB.001 |
| PV-1910 (CAT5) | Ethernet Cable | Bel Inc. or Equivalent | BC-5UE001F |
| PV-1920 (MODEM1) | Communication Module | Sierra Wireless | FX30 LTE-M |
| PV-1930 (PSU1) | Power Supply | IDEC | PS5R-VC24 |

It will be appreciated that the circuitry and components of the smart controller 102 may be different that that illustrated in the circuit 200 of FIG. 2 and described herein. For example, the sequencer module 104 may comprise a general-purpose PLC or microcontroller coupled with additional circuitry for implementation in the high-voltage environment of the smart controller 102. Or the sequencer module 104, the switching devices 202A-202F, the communication module 110, and other components and circuitry of the smart controller 102 may be integrated within a common modular package or distributed among multiple modular packages. Similarly, the illustrated connection pathways are provided for purposes of illustration and not of limitation, and some components and/or interconnections may be omitted for purposes of clarity. It will be further appreciated that the smart controller 102 may not include all of the components shown in FIG. 2, may include other components that are not explicitly shown in FIG. 2, or may utilize an architecture completely different than that shown in FIG. 2.

Figure 4A:
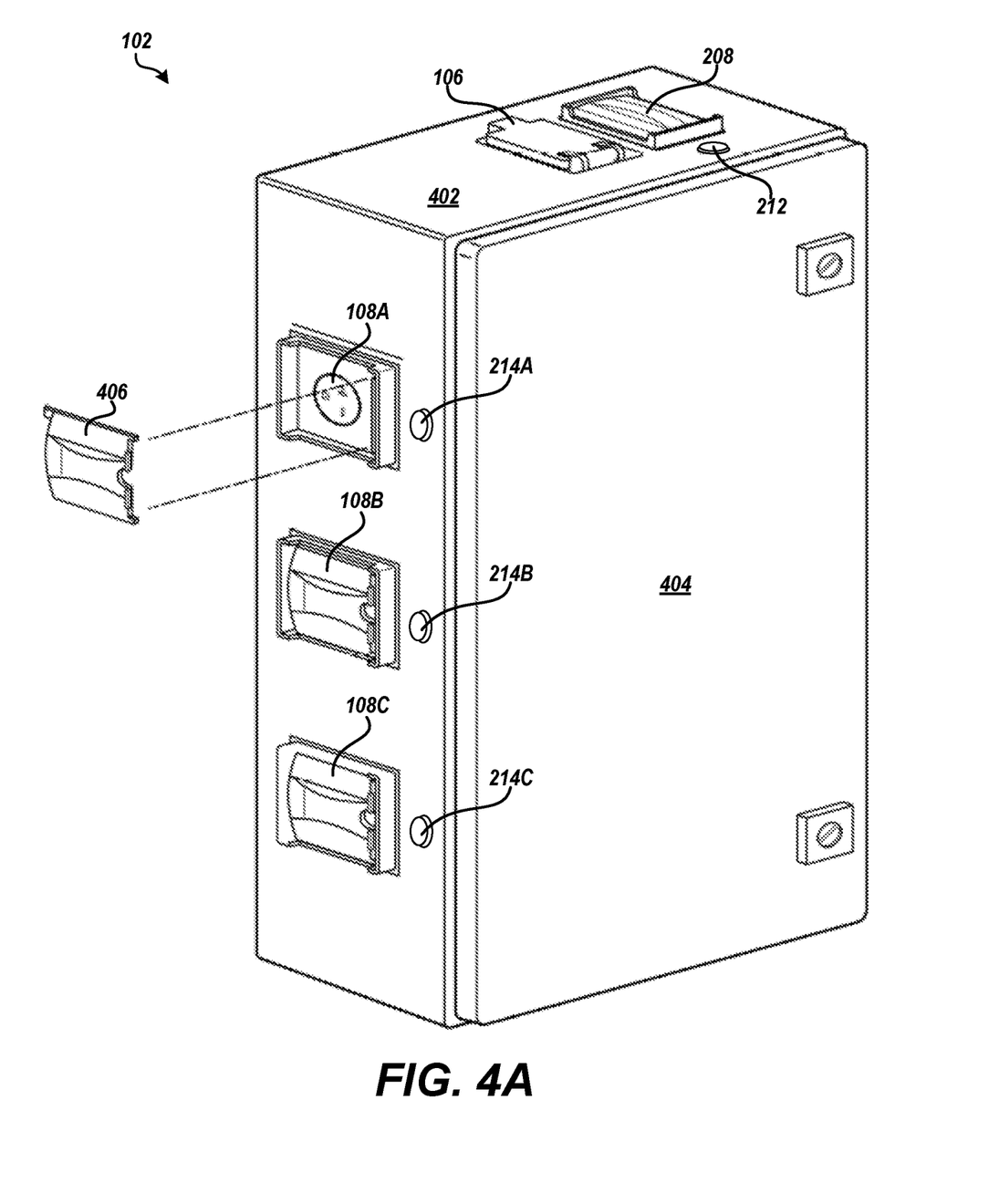
FIG. 4A is a perspective view showing one implementation of the smart controller device, according to embodiments presented herein.
Figure 4B:
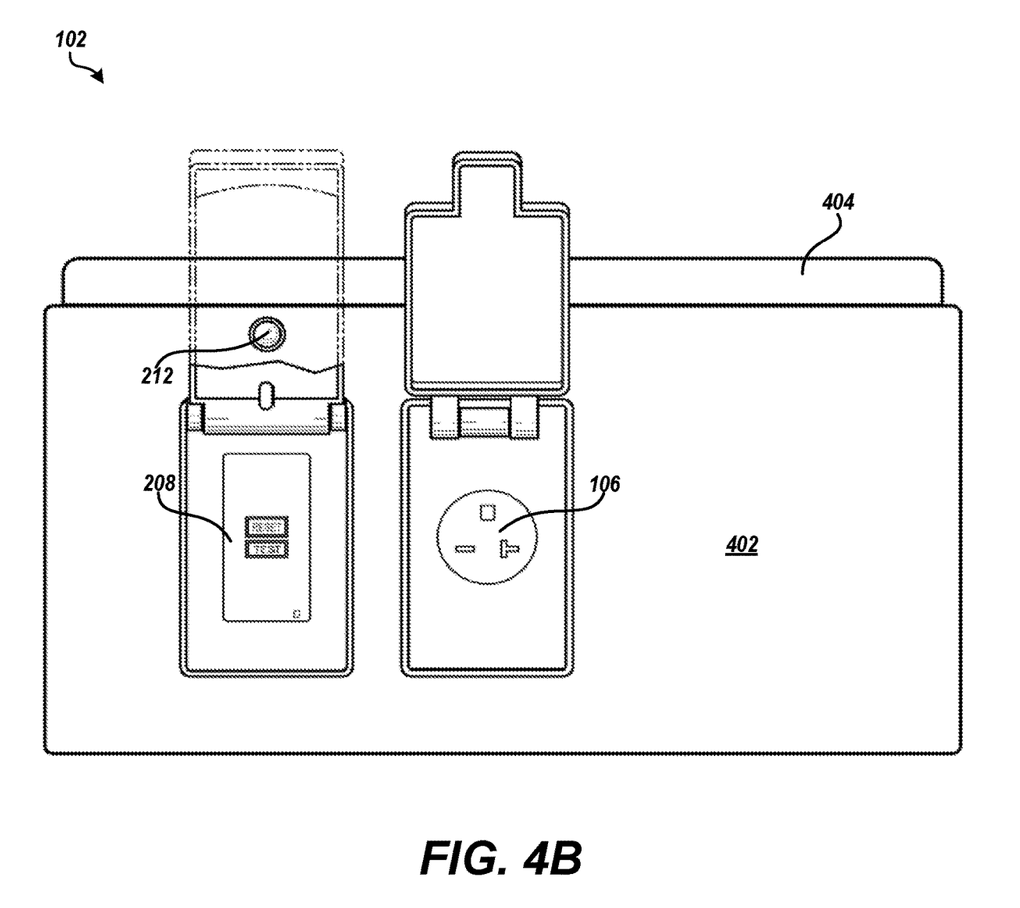
FIG. 4B is an end view of the implementation of the smart controller device, according to embodiments presented herein.
Figure 4C:
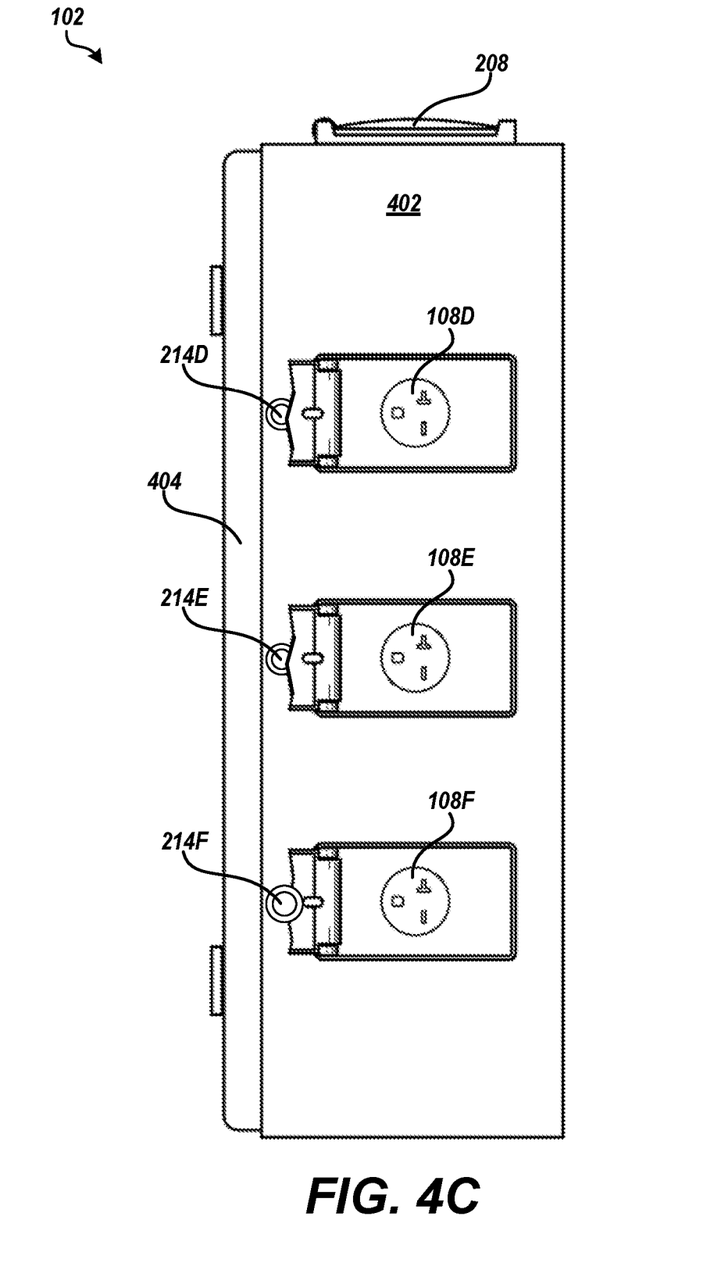
FIG. 4C is a side view of the implementation of the smart controller device, according to embodiments presented herein.

FIGS. 4A-4D show views of an illustrative physical implementation of the smart controller 102, according to some embodiments. The smart controller 102 may comprise an enclosure 402, as shown in FIGS. 4A-4C. The enclosure 402 may be sealed and designed to be rugged and service-free, as well as designed/rated for indoor and outdoor use and in wet environments. The form-factor for the smart controller 102 may be made to be compact and portable, allowing it to be carried by an average person and stowed in an office, in the cab of a truck, on a flatbed trailer, or virtually anywhere it is needed.

The components of the smart controller 102, such as the sequencer module 104, the switching devices 202, the current sensor 204, the communication module 110, and the like, along with the electrical collections between the components may be disposed in the interior of the enclosure 402. The enclosure 402 may include an access door 404 that provides a weather-tight seal when closed and can be locked to allow access to internal components only by qualified service personnel. The enclosure 402 may further include externally accessible ports for the power input port 106 and the power outlets 108A-108F. Similarly, the GFCI 208 may be mounted for access from outside the enclosure 402. According to some embodiments, the power input port 106 and the power outlets 108A-108F may comprise standard electrical connectors, as further shown in FIGS. 4A-4C, allowing the device to be connected to an external power source and downstream devices, such as battery chargers, by standard electrical cables.

In further embodiments, the external ports for the power input port 106, the power outlets 108A-108F, and/or the GFCI 208 may include weather-proof covers, such as cover 406 shown in FIG. 4A, to allow for a wide variety of operating conditions and environments for the smart controller 102. The indicator lights 212 and 214A-214B described above in regard to FIG. 2 may also be mounted on or otherwise visually accessible from the exterior of the enclosure 402 to allow confirmation by a user of the smart controller 102 that the device is connected to input power, which power outlet(s) in the sequence are presently being powered, and generally that the device is working properly. According to further embodiments, the smart controller 102 may include a convenient shoulder strap for carrying (not shown). The antenna 216 for the communication module 110 may further be mounted on the exterior of the enclosure 402.

Figure 4D:
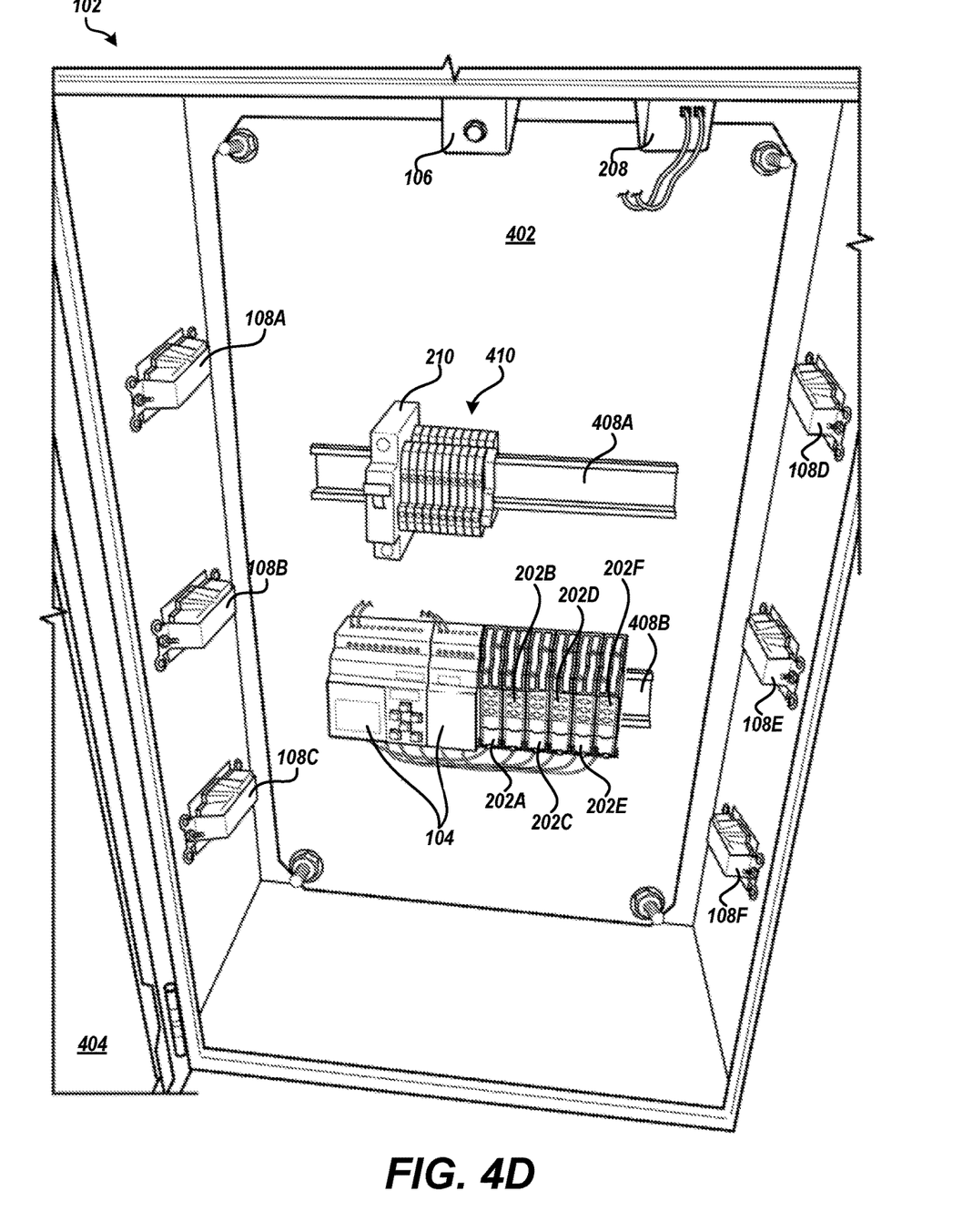
FIG. 4D is another perspective view of the implementation of the smart controller device showing internally mounted components of the smart controller device, according to embodiments presented herein.

FIG. 4D shows an interior view of the enclosure 402 of the smart controller 102 depicted in FIGS. 4A-4C with the access door 404 opened, according to some embodiments. It will be appreciated that the connections between internal components have been removed from FIG. 4D for clarity. In some embodiments, the sequencer module 104, circuit breaker 210, switching devices 202A-202F, and other components of the smart controller 102 may be disposed in the interior of the enclosure 402 on internally mounted DIN rails, such as DIN rails 408A and 408B, to allow for simple, modular assembly, reconfiguration, and maintenance of the device. According to some embodiments, mounting of the switching devices 202A-202F to the DIN rails 408B may be accomplished using DIN-mounted relay sockets (not shown) (labeled PV-1560 in Table 1). In further embodiments, the high-voltage connections between the various components may be made through DIN rail-mounted connection blocks, such as the connection blocks shown at 410 in FIG. 4D (labeled PV-1660-01, PV-1670-01, and PV-1680-01 in circuit 200 and Table 1).

It will be appreciated that alternative physical implementations and enclosure designs for the smart controller 102 beyond those described herein and shown in the figures will become apparent to one of ordinary skill upon reading of this disclosure. For example, the sequencer module 104 may be implemented inside the enclosure 402 and interface to an external communication module 110 via an Ethernet cable that passes through an external RJ-45 connector on the enclosure 402. In addition, the circuits, ports, power outlets 108, and the like may contain additional/alternative components or be configured to achieve industry safety certifications. For example, the circuit 200 may include additional breakers, fuses, or sealed connectors to achieve UL compliance. It is intended that all such additional/alternative physical implementations, components, and enclosures be included in the scope of this disclosure.

Figure 5:
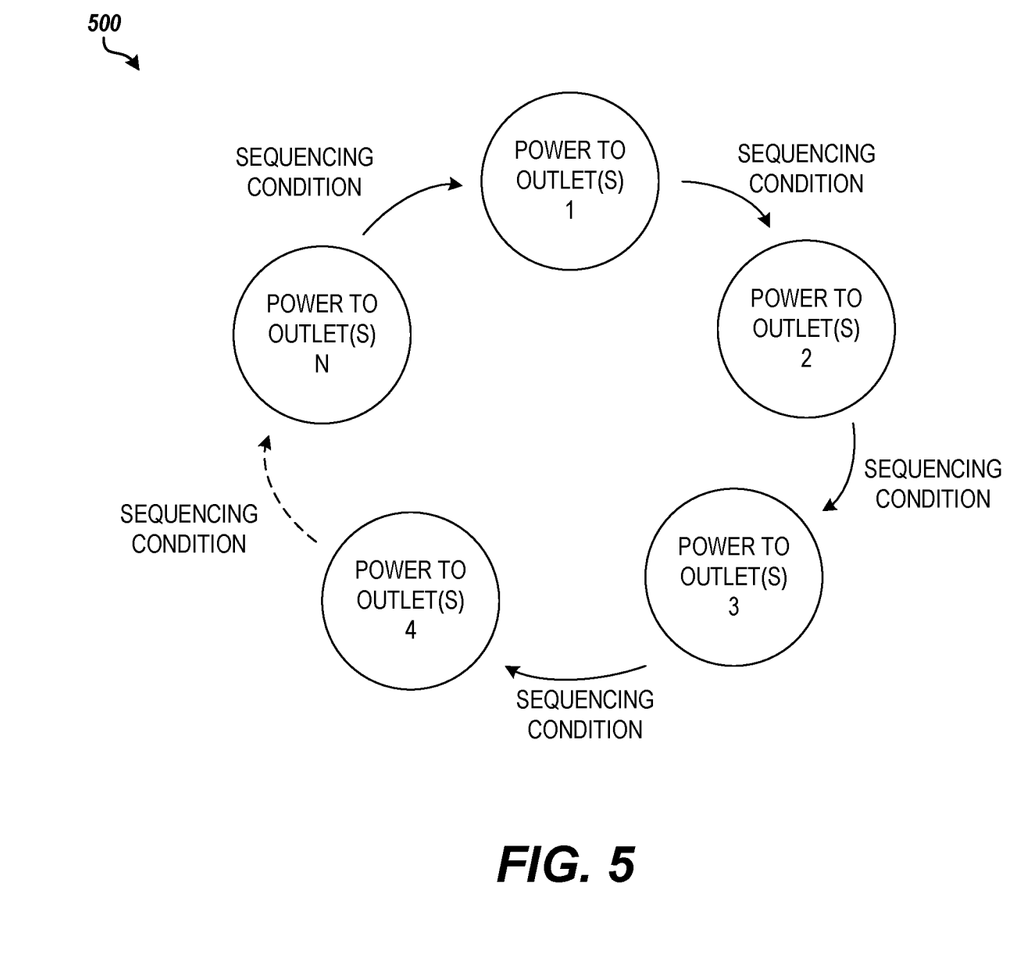
FIG. 5 is a state diagram showing high-level details of the sequencing of power to the outlets in the smart controller, according to embodiments described herein.

FIG. 5 shows a high-level state diagram of an illustrative sequence 500 for sequencing the routing of power from the power input port 106 to the power outlets 108A-108N of the smart controller 102, according to some embodiments. According to embodiments, the sequencing of power to the power outlets 108 of the smart controller 102 may be effected by the sequencer module 104 utilizing a number of sequencing programs and/or routines, along with associated configuration data, contained in the memory 122 and executed by the CPU 120. A first one or more of the power outlets 108 in the sequence 500 may be turned on for powering of connected devices, such as a battery charger, until a sequencing condition occurs. The sequencing condition may include the configured duration of time for the power outlet(s) being on exceeded (first sequencing condition), a current draw at the powered outlet(s) dropping below a configurable current threshold value (second sequencing condition), or a combination of these and other conditions. When the sequencing condition occurs, the first outlet(s) in the sequence 500 are turned off and the next one or more power outlets 108A-108N of the sequence are turned on. The sequence 500 may consist of the individual outlets in numerical order, such as first power outlet 108A, then power outlet 108B, power outlet 108C, and so on to the final power outlet 108N. In further embodiments, the sequence 500 may include multiple outlets on at a particular step, such as first power outlets 108A and 108D, then power outlets 108B and 108E, then power outlets 108C and 108F, and so on. According to embodiments, any number of routines or programs encompassing any number of sequences 500 may be contained in the memory 122 of the sequencer module 104 in the smart controller 102, along with associated configuration data defining sequencing conditions, timing information, and the like.

When the sequencing condition of the last power outlet 108N occurs, the smart controller 102 may restart the sequence 500, again turning on the first outlet(s) in the sequence, or may end the sequence. According to further embodiments, the smart controller 102 may repeat the sequence 500 a configurable number of times, an indefinite number of times within a configurable operation time window, until no outlets draw more than the configurable current threshold value, and/or any combination of these or other end-of-sequence events, according to the program/routine and configuration data associated with the sequence.

Figure 6:
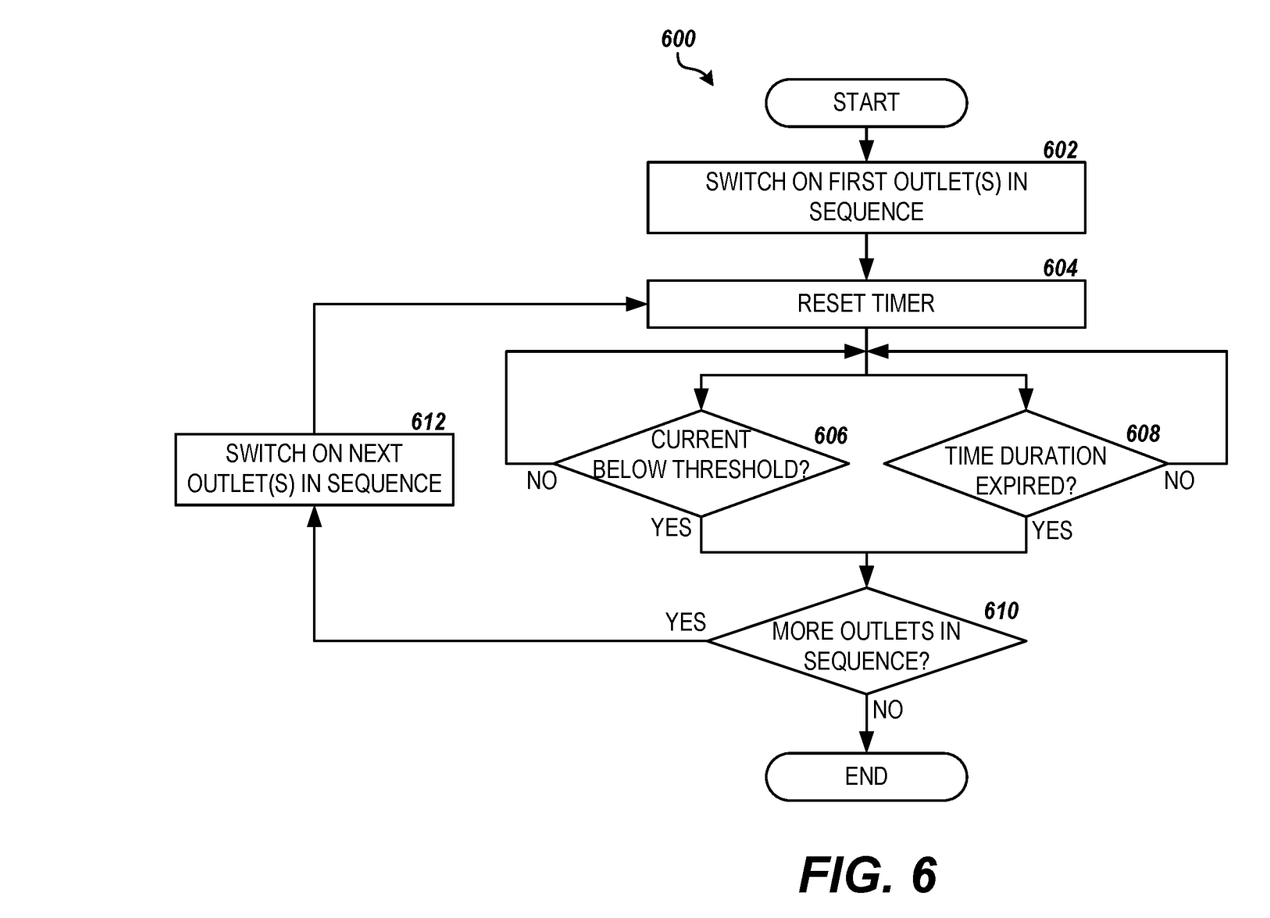
FIG. 6 is a flow diagram illustrating one routine for sequencing input power among multiple outlets in the smart controller, according to embodiments described herein.

FIG. 6 illustrates one routine 600 for the smart controller 102 to route power from the power input port 106 to the power outlets 108A-108N, according to some embodiments. In some embodiments, the routine may be performed by the sequencer module 104 of the smart controller 102. According to further embodiments, the memory 122 of the sequencer module 104 may contain CPU-executable code that, when executed by the CPU 120 of the sequencer module, cause the smart controller 102 to perform the routine 600. In other embodiments, the routine 600 may be performed by some combination of the sequencer module 104 or other processing device in the smart controller 102 in conjunction with other, external or remote computing devices, components, and modules of the environment 100 described above.

The routine 600 begins at step 602, where the smart controller 102 switches on a first one or more of the power outlets 108A-108N in the sequence. As described above, this may include a single outlet, such as power outlet 108A, or a group of outlets, such as power outlets 108A and 108D, based on configuration data associated with the sequence stored in the memory 122 of the sequencer module 104, for example. The one or more of the power outlets 108A-108N may be switched on by the sequencer module 104 activating the associated switching devices 202A-202N, for example. From step 602, the routine 600 proceeds to step 604, where the smart controller 102 resets a timer for tracking the amount of time the switched-on power outlet(s) 108 are powered. The timer may represent a function or feature of the sequencer module 104, for example.

Next, the routine 600 proceeds to step 606, where the smart controller 102 checks to see if the current drawn by the switched-on power outlet(s) 108 falls below the configurable current threshold value (second sequencing condition), and step 608, where the smart controller 102 checks whether the configured duration of time for the currently switched-on power outlets being on has expired (first sequencing condition). According to some embodiments, the current drawn by the switched-on power outlet(s) 108 may be determined by the sequencer module 104 by the connected current sensor 204 configured current to read current draw of the downstream devices connected to the power outlets 108. The configurable current threshold value and duration of on time for the outlets may be stored in the memory 122 of the sequencer module 104 as part of the configuration data associated with the sequence, for example.

If the current drawn by the switched-on power outlets 108 has fallen below the configurable current threshold value or the configured duration of on time has expired for the currently switched-on power outlets, the routine 600 proceeds to step 610, where the smart controller 102 determines whether additional one or more of the power outlets 108A-108N exist in the configured sequence. As described above, the sequence may consist of the individual outlets in numerical order, such as first power outlet 108A, then power outlet 108B, power outlet 108C, and so on to the final power outlet 108N, or the sequence may include multiple outlets on at a particular step, such as first power outlets 108A and 108D, then power outlets 108B and 108E, then power outlets 108C and 108F, and so on. In addition, the smart controller 102 may stop the sequence after the last power outlet, repeat the sequence a configurable number of times, repeat the sequence an indefinite number of times within a configurable operation time window, repeat the sequence until no outlets draw more than the configurable current threshold value, and/or the like, based on the configuration data associated with the sequence.

If the smart controller 102 determines that additional power outlets exist in the configured sequence, the routine 600 proceeds from step 610 to step 612, where the controller switches on the next one or more of the power outlets 108A-108N in the sequence. From step 612, the routine 600 returns to step 604, where the controller resets the sequence timer, and the sequencing continues. If, at step 610, the controller determines that there are no additional power outlets in the configured sequence to be switched on, the routine 600 ends.

Based on the foregoing, it will be appreciated that technologies for a smart controller device capable of configurable sequencing of power across multiple outlets suitable for connecting to multiple device/equipment chargers are presented herein. The above-described embodiments are merely possible examples of implementations set forth for a clear understanding of the principles of the present disclosure. Many variations and modifications may be made to the above-described embodiments without departing substantially from the spirit and principles of the present disclosure. All such modifications and variations are intended to be included within the scope of the present disclosure, and all possible claims to individual aspects or combinations and sub-combinations of elements or steps are intended to be supported by the present disclosure.

The logical steps, functions or operations described herein as part of a routine, method or process may be implemented (1) as a sequence of CPU-implemented acts, software modules or portions of CPU-executable code running on a PLC, microcontroller, or computing system and/or (2) as interconnected machine logic circuits or circuit modules within a sequencer module 104 or other computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

What is claimed is:

1. A smart controller device comprising:
   a power input port;
   a plurality of power outlets, each power outlet comprising a standard electrical connector for connection to common electrical devices by a conventional electrical power cable;
   a sequencer module configured to:
      route power from the power input port to a first one or more of the plurality of power outlets,
      detect an occurrence of at least one sequencing condition determined by an internal component of the smart controller, and
      upon detecting the occurrence of the at least one sequencing condition, discontinue the routing of power from the power input port to the first one or more of the plurality of power outlets and route power from the power input port to a second one or more of the plurality of power outlets; and
   an enclosure incorporating the power input port, the plurality of power outlets, and the sequencer module;
   wherein the sequencer module is enclosed by the enclosure, the enclosure being sealed such that the smart controller device is rated for indoor use, outdoor use, and in wet environments;
   wherein the power input port and the plurality of power outlets are externally accessible from an outside of the enclosure and enclosable by weather-proof covers on the outside of the enclosure to support the rating for indoor use, outdoor use, and in wet environments; and
   wherein the enclosure is of a form-factor such that the smart controller device is portable and carriable by an average person and comprises a shoulder strap for easy carrying of the smart controller device.

2. The smart controller device of claim 1, further comprising a timer function of the sequencer module, wherein the at least one sequencing condition comprises an amount of time that power has been routed from the power input port to the first one or more of the plurality of power outlets exceeding a configured duration of time as determined by the timer function.

3. The smart controller device of claim 1, further comprising an internal current sensor configured to measure a current draw of devices connected to the plurality of power outlets, wherein the at least one sequencing condition comprises the measured current draw of devices connected to the first one or more of the plurality of power outlets falling below a configured current threshold value as determined by the internal current sensor.

4. The smart controller device of claim 1, wherein the sequencer module comprises a programmable logic controller ("PLC"), the PLC having a memory containing at least one routine defining a sequencing of power from the power input port to the first one or more of the plurality of power outlets and the second one or more of the plurality of power outlets and the at least one sequencing condition.

5. The smart controller device of claim 1, further comprising a switching device corresponding to each of the plurality of power outlets configured to electrically connect the power input port to the power outlet, wherein routing power from the power input port to one of the plurality of power outlets comprises the sequencer module activating the switching device corresponding to the power outlet.

6. The smart controller device of claim 1, further comprising a plurality of indicator lights externally visible from the outside of the enclosure and configured to provide an indication to a user of the smart controller device at least that the smart controller device is connected to input power and which of the plurality of power outlets are presently being powered.

7. The smart controller device of claim 1, wherein the power from the power input port is routed to the plurality of power outlets through one or more of a circuit breaker and a ground-fault circuit interrupter ("GFCI") configured to protect the smart controller device and devices connected to the plurality of power outlets.

8. The smart controller device of claim 1, further comprising a communication module operably connected to the sequencer module and configured to allow remote computer devices to configure and operate the smart controller device.

9. The smart controller device of claim 8, where the communication module comprises a cellular modem.

10. A method of sequencing power from a power input port to a plurality of power outlets in a smart controller device, the method comprising:
switching on a first one or more of the plurality of power outlets based on a configured sequence;
detecting an occurrence of at least one sequencing condition determined by an internal component of the smart controller device;
upon detecting the occurrence of the at least one sequencing condition, switching off the first one or more of the plurality of power outlets;
determining whether a next one or more of the plurality of power outlets exist in the configured sequence; and
upon determining that the next one or more of the plurality of power outlets exist in the configured sequence, switching on the next one or more of the plurality of power outlets;
wherein each of the plurality of power outlets comprises a standard electrical connector for connection to common electrical devices by a conventional electrical power cable, the power input port and the plurality of power outlets incorporated in and externally accessible from an outside of an enclosure of the smart controller device;
wherein the enclosure encloses a sequencer module for performing the method and is sealed such that the smart controller device is rated for indoor use, outdoor use, and in wet environments, the externally accessible power input port and plurality of power outlets being enclosable by weather-proof covers on the outside of the enclosure to support the rating for indoor use, outdoor use, and in wet environments; and
wherein the enclosure is of a form-factor such that the smart controller device is portable and carriable by an average person and comprises a shoulder strap for easy carrying of the smart controller device.

11. The method of claim 10, further comprising:
repeating the detecting, switching-off, determining, and switching-on until it is determined that a next one or more of the plurality of power outlets does not exist in the configured sequence.

12. The method of claim 10, further comprising:
upon determining that a next one or more of the plurality of power outlets does not exist in the configured sequence, repeating the sequencing from the first one or more of the plurality of power outlets again.

13. The method of claim 10, wherein the method is performed at scheduled time of day based on the configured sequence.

14. The method of claim 10, wherein the at least one sequencing condition comprises an amount of time that power has been routed from the power input port to the first one or more of the plurality of power outlets exceeding a configured duration of time as determined by a timer function of a sequencer module component of the smart controller device.

15. The method of claim 10, wherein the at least one sequencing condition comprises a measured current draw of devices connected to the first one or more of the plurality of power outlets falling below a configured current threshold value as determined by an internal current sensor of the smart controller device.

16. The method of claim 10, wherein the sequencer module has a memory containing at least one routine defining the configured sequence and the at least one sequencing condition.

17. A smart controller device for sequencing power from a power input port to a plurality of power outlets, the smart controller device comprising:
an enclosure of a form-factor such that the smart controller device is portable and carriable by an average person;
the power input port comprising a standard electrical connector externally accessible from an outside of the enclosure for connection to an external power source by a conventional electrical power cable;
the plurality of power outlets comprising standard electrical connectors disposed inside of the enclosure and externally accessible from the outside of the enclosure for connection to common electrical devices by a conventional electrical power cable; and
an electrical circuit contained inside the enclosure and electrically connected to the power input port and each of the plurality of power outlets, the electrical circuit comprising a sequencer module configured to:
switch on a first one or more of the plurality of power outlets based on a configured sequence,
detect an occurrence of one or more sequencing conditions determined by internal components of the smart controller device,
upon detecting the occurrence of the one or more sequencing conditions, switching off the first one or more of the plurality of power outlets, determine whether a next one or more of the plurality of power outlets exist in the configured sequence, and upon determining that the next one or more of the plurality of power outlets exist in the configured sequence, switch on the next one or more of the plurality of power outlets;

wherein the enclosure is sealed and the externally accessible power input port and plurality of power outlets are enclosable by weather-proof covers on the outside of the enclosure to support a rating for indoor use, outdoor use, and in wet environments.

18. The smart controller device of claim 17, further comprising a shoulder strap for carrying of the smart controller device.

* * * * *